United States Patent [19]
Smith et al.

[11] 3,906,239
[45] Sept. 16, 1975

[54] LIGHT MEASURING APPARATUS FOR APERTURED MATERIAL

[75] Inventors: Charles W. Smith, Ulster; Mahlon D. Dyer, Sugar Run, both of Pa.

[73] Assignee: GTE Sylvania Incorporated, Stamford, Conn.

[22] Filed: May 8, 1974

[21] Appl. No.: 467,940

[52] U.S. Cl. ............... 250/562; 250/216; 250/572; 356/237
[51] Int. Cl.² ........................................ G01N 21/32
[58] Field of Search .......... 250/572, 227, 216, 562, 250/569; 356/237, 239

[56] References Cited
UNITED STATES PATENTS

| | | | |
|---|---|---|---|
| 3,536,409 | 10/1970 | Belser et al. | 356/238 |
| 3,628,030 | 12/1971 | Fertig et al. | 250/572 |
| 3,655,989 | 4/1972 | Robinson | 250/572 |
| 3,808,447 | 4/1974 | Leavens, Jr. | 250/569 |

*Primary Examiner*—Walter Stolwein
*Attorney, Agent, or Firm*—Norman J. O'Malley; Lawrence R. Fraley; Donald R. Castle

[57] ABSTRACT

An apparatus for determining the amount of light passing through relatively thin strip of apertured metallic material such as formed in standard aperture masks utilized in color television cathode ray tubes.

9 Claims, 5 Drawing Figures

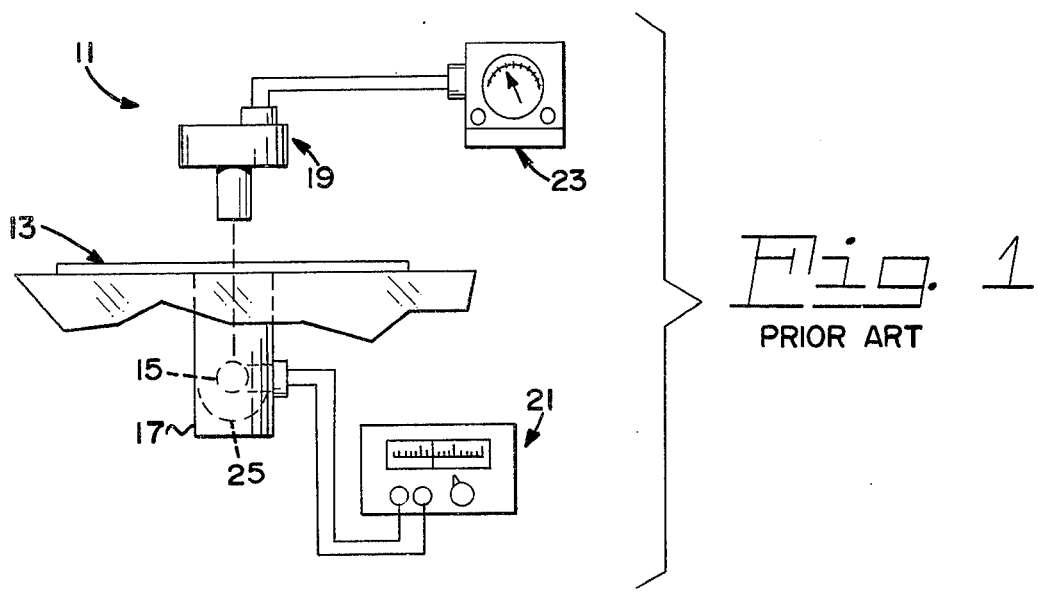
Fig. 1
PRIOR ART
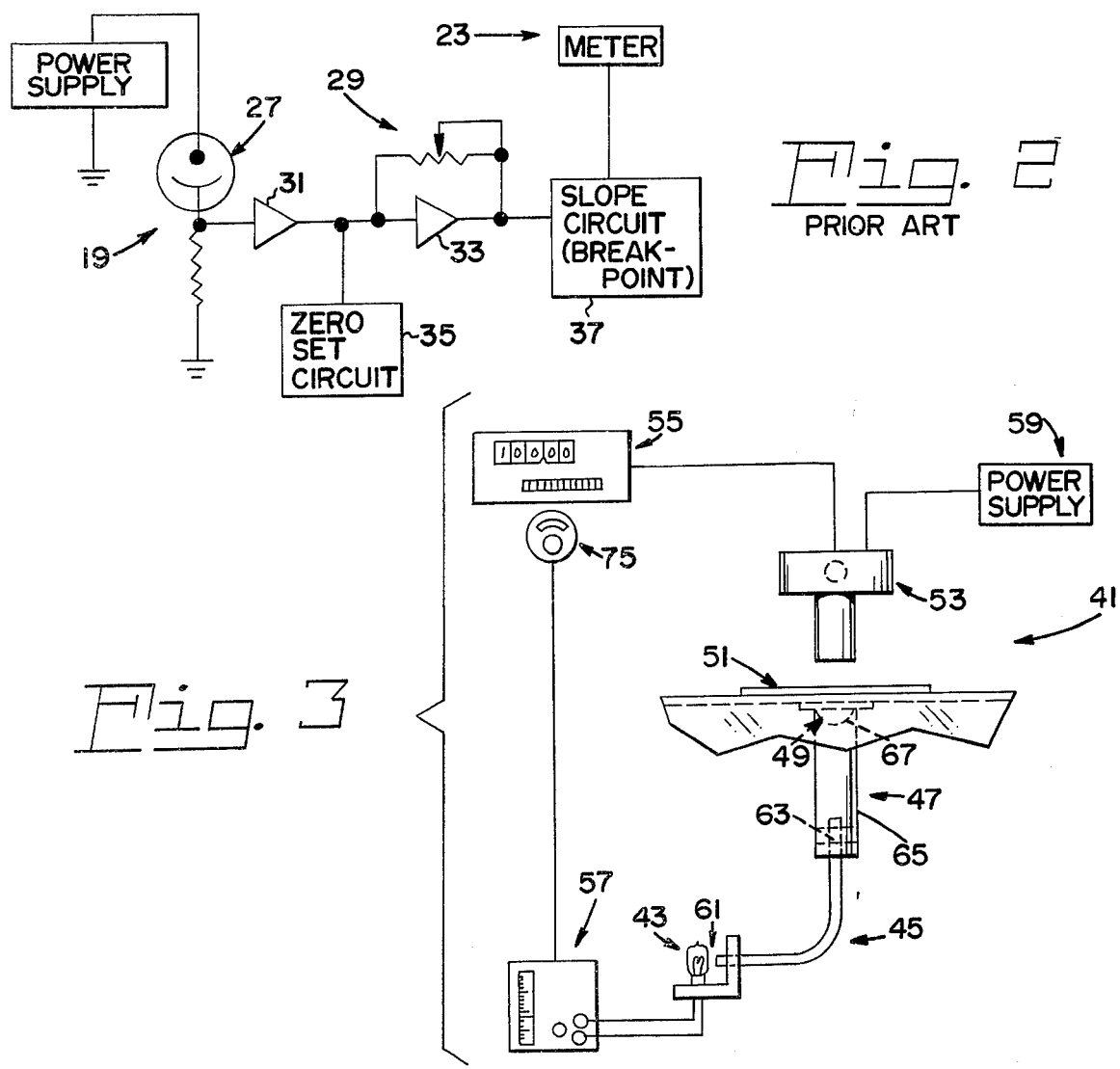
Fig. 2
PRIOR ART
Fig. 3

LIGHT MEASURING APPARATUS FOR APERTURED MATERIAL

BACKGROUND OF THE INVENTION

This invention relates to apparatus for determining the amount of light passing through opaque apertured material. Even more particularly, this invention relates to apparatus for determining amount of light passing through relatively thin strips of apertured metallic material.

A common example of relatively thin apertured metallic material is the standard aperture mask found in most color television cathode ray tubes. Aperture masks are typically produced from sheets of very thin metal, usually steel, and contain thousands of small apertures or holes through which the electron beams emitted by the tube's electron guns pass to strike the proper phosphor dots on the cathodoluminescent screen. The primary function of the mask is to assure that the correct color combinations are achieved on the screen while not allowing electron beams to overlap and strike other dots. Typical examples of the sizes of the apertures may range from 0.005 to 0.014 inches with center-to-center spacings within the range from 0.02 to 0.03 inches, depending on the overall size of the mask and corresponding picture tube.

It is essential therefor that in order for the proper electron beam - phosphor dot combinations to be achieved, the overall sizes of the apertures in the mask must be maintained within close tolerances.

A well known prior art method for measuring the sizes of holes in aperture mask involved a sampling and comparing technique during which a beam of light from a conventional light source was directed through "samples" of the masks as produced. These samples were then compared to "standards" of acceptable mask samples which had previously been calibrated by densitometers and toolmakers microscopes. These standards were usually made from a special stainless steel alloy and had to be specially produced at relatively high costs. It was necessary when using this method to continuously calibrate the system every hour or so in order to assure the desired tolerance ranges.

It is believed therefore that an apparatus for determining the amount of light passing through an apertured material and therefore the hole sized in said material which could be easily calibrated, would eliminate the necessity for comparitive analysis with additional standards or similar articles, and would be substantially easier to operate than prior art devices would constitute an advancement in the art.

OBJECTS AND SUMMARY OF THE INVENTION

Accordingly, it is a primary object of this invention to provide a new and unique apparatus for determining the amount of light passing through a strip of apertured material, thus providing a direct indication of the aperture sizes within the strip.

It is a further object of this invention to provide such an apparatus which obviates the described disadvantages of known prior art devices.

It is a still further object of this invention to provide such an apparatus which is easy to operate and is relatively inexpensive to manufacture.

In accordance with a preferred aspect of this invention, there is provided an apparatus for determining the amount of light passing through an apertured material. The apparatus comprises a light source, a diffusion means for diffusing the light from the light source, a collimation means for collimating the diffused light from the diffusion means, and a focusing means for receiving the collimated light from the collimation means and providing a focused beam of light through the apertured material. The apparatus further comprises a receiving means positioned on an opposing side of the material from the focusing means to receive the described focused light beam and a measuring means operatively connected to the receiving means for measuring the amount of light received by the receiving means.

BRIEF DESCRIPTION OF THE DRAWINGS

FIG. 1 illustrates a prior art light detection apparatus.

FIG. 2 illustrates the electrical circuit typically found in prior art light detection apparatus.

FIG. 3 is a view of a preferred embodiment of the present invention.

DESCRIPTION OF THE PREFERRED EMBODIMENTS

Figure 4:
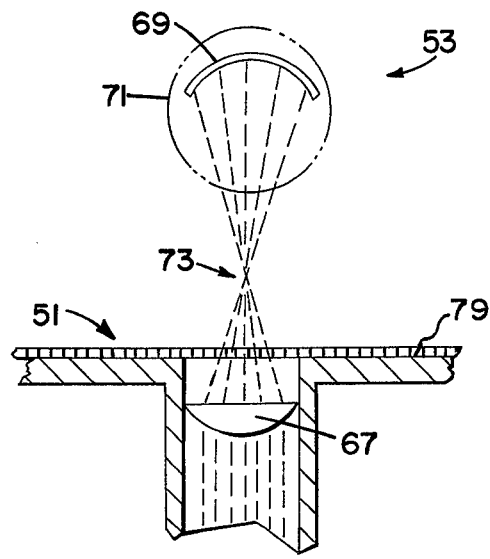
FIG. 4 is an enlarged partial view of the preferred focusing and receiving means of the present invention.

For a better understanding of the present invention, together with other and further objects, advantages and capabilities thereof, reference is made to the following disclosure and appended claims in connection with the above-described drawings.

With particular reference to FIG. 1 there is shown a typical prior art light detection apparatus 11 for detecting the amount of light passing through an apertured material 13. This prior art device typically consisted of an established light source 15 positioned within a cylindrical housing 17. Light source 15 provided a beam of light through the apertured material 13 to a phototube receiver 19. Power for light source 15 was supplied by an established power source 21. The light received by the phototube receiver 19 was electrically converted to provide an indication, such as by a meter 23. In effect, the phototube receiver 19 converted the amount of incident light which it received on its photocathode to electrical current, supplying this current to the indicating meter 23.

To further enhance the passage of light from light source 15 to receiver 19, a shield type reflector 25 was utilized. To determine the relative sizes of the apertures within material 13, the reading as provided by meter 23 was then further calibrated.

While apparatus 11 seemed rather simple in operation, there were several disadvantages readily apparent when using this system. A primary disadvantage was typically found in the optical system of the apparatus. That is, the light supplied by light source 15 was generally nonuniform in brightness as well as unsteady in its intensity. Because of this, complicated electronics were required to compensate for the described nonlinearities. These added electronics further increased the complexity and probability of failure of apparatus 11. An example of such added circuitry is illustrated in FIG. 2. Phototube 27 of the phototube receiver 19 is illustrated as being electrically connected to an amplifier circuit 29. The amplifier circuit usually consisted of an isolating amplifier 31 and a variable gain amplifier 33. In addition to these amplifiers, a zero set circuit was required to establish the value of the calibration standard having the smallest apertures. Furthermore, a slope circuit 37 was also essential to provide the proper operating curve as determined by the calibration standard having the largest apertures. Slope circuit 37 then provided meter 23 with the required electrical current.

As can be appreciated, when utilizing the system of apparatus 11 it was necessary to calibrate the apparatus periodically in order to assure its accuracy. As explained, this calibration required the use of separate standards which were portions of specially made apertured material. These standards in turn required calibration by the use of additional densitometers and toolmakers microscopes. It can be understood therefore that if the standards required for calibrating apparatus 11 were themselves in error, this error was further amplified in the eventual readout of apparatus 11. This error was even further amplified by the described methods for calibrating the standards. When utilizing known densitometers, it was necessary to rotate the standards to obtain an average value for each. Therefore, any referenced value used for these articles was at best only an average value.

In FIG. 3 there is illustrated a preferred embodiment of the present inventon, apparatus 41. Apparatus 41 comprises a light source 43, a diffusion means 45 positioned relative to light source 43 and adapted for receiving the light therefrom, a collimation means 47 positioned relative to diffusion means 45 and adapted for receiving the diffused light from diffusion means 45, and a focusing means 49 (hidden) positioned relative to collimation means 47 and on one side of the apertured material 51 to be measured. In addition, apparatus 41 comprises a receiving means 53 positioned on an opposing side of apertured material 51 from focusing means 49 and adapted for receiving the focused light passing through the apertured material from focusing means 49, and a measuring means 55 operatively connected to receiving means 53 for measuring the amount of light received by said receiving means. Added optional components which may be utilized with apparatus 41 include a pair of power supplies 57 and 59. Power supply 57 is utilized to provide electrical energy to light source 43 while power supply 59 supplies receiving means 53.

In the preferred embodiment of the present invention, light source 43 comprises a heavy filament lamp having a translucent or partially opaque glass envelope. A lamp successfully utilized in the present invention is rated at 6 volts - 55 watts with a ten ampere filament and has an operating life in excess of 10,000 hours. In addition, the described lamp provides exceptional stability as well as steady intensity for the described long periods.

Diffusion means 45 has a first end 61 positioned substantially adjacent light source 43 and is adapted for receiving light therefrom. In the preferred embodiment, diffusion means 45 comprises a random mix fiber optics bundle having an approximate diameter of one-fourth inches. Diffusion means 45 thus provides collimation means 47 with a source of diffused light thereby assuring that the filament image of the described lamp will not be projected on focusing means 49. Such was a problem of the described prior art apparatus 11. An opposing end 63 of diffusion means 45 is positioned within an end of collimation means 47. In the preferred embodiment, collimation means 47 comprises a substantially cylindrical collimator tube 65 having a darkened inner surface. This darkened inner surface is provided by coating the internal diameter of cylinder 65 with optical black, a known material in the photo-optics industry.

Accordingly, a substantially parallel diffused beam of light is supplied focusing means 49. In the preferred embodiment of the invention, focusing means 49 comprises an aspheric condensor lens 67 having a convex surface upon which the light passing through the collimator tube 65 will impinge. As illustrated in FIG. 4, this collimated light is substantially focused by lens 67 to pass through apertured material 51 and strike the photocathode 69 of phototube 71, located within the preferred embodiment of receiver means 53. As further illustrated in FIG. 4, the focal point 73 for the focused light passing through apertured material 51 is preferably between apertured material 51 and the photocathode 69, thus providing photocathode 69 with a virtual image. Although not necessary, it can be understood that lens 67 could provide photocathode 69 with a direct image with the resulting focal point positioned substantially beyond the photocathode. The method illustrated in FIG. 4 is preferred however when detecting the light passing through apertured material as particularly utilized in color television aperture mask production. As it is now common practice in the production of aperture masks to provide apertures of substantially conical configuration, the method described in FIG. 4 has been proven to be substantially more efficient when detecting this type of material. This is primarily due to the substantially increased angle of the light beams passing through the material 51. As illustrated in FIG. 4, the provision of a focal point substantially between the photocathode and material 51 substantially increases the angle of these beams thereby providing a more direct reading of a material having the described conical configuration for its apertures.

Figure 5:
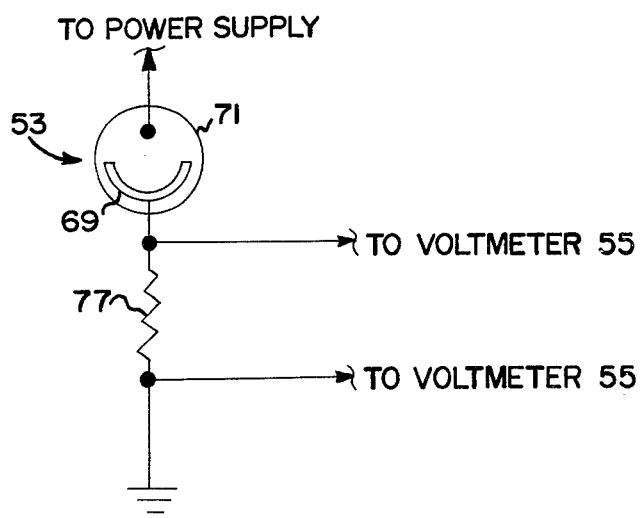
FIG. 5 illustrates the preferred connection between the receiving and measuring means of the present invention.

In FIG. 5 there is illustrated a preferred method for electrically joining measuring means 55 (shown in FIG. 3) to receiving means 53. As further shown in FIG. 3, measuring means 55 comprises a digital voltmeter which in turn can be adjusted by a fine voltage adjusting means 75. Adjusting means 75 is in turn electrically connected to power supply 57. With reference back to FIG. 5, the electrical connection above the described digital voltmeter and phototube 71 of the receiver means 53 is shown. It is preferred that phototube 71 have a temperture compensated resistor 77 electrically connected to photocathode 69. The purpose of utilizing a temperature compensated resistor is well established in the electrical field. Such a resistor, when connected in the manner illustrated in FIG. 5, assures that a highly stable and therefor accurate measurement of the voltage generated thereacross can be obtained by a suitable measuring unit, in this case voltmeter 55. This accuracy is maintained despite varying ambient conditions due to the capability of the resistor to compensate for such conditions. Accordingly, the radiant energy received by photocathode 69 is converted to electrical energy which in turn passes through resistor 77. The described digital voltmeter is electrically connected to measure and thus provide an indication of the voltage generated across resistor 77.

The operation of apparatus 41 is substantially simpler than that of the prior art apparatus 11. Initially, the apertured material is removed and full light permitted to pass through focusing means 67 and onto photocathode 69. The apparatus operator then adjusts the adjusting means 75 to cause measuring means 55 to give a reading typical of 100 percent light transmission. In short, it is preferred when utilizing a digital voltmeter to adjust the voltmeter to read 100 millivolts. Because the described apparatus is adjusted both optically and electrically to read from full light to partial transmission, no further setup of the apparatus is required. In other words, no calibrating standards are needed. The operator then places the material to be measured between the focusing means 49 and receiver 53 (as on a tabled surface 79, shown in FIG. 4). With apparatus 41 activated, measuring means 55 will then provide a percent transmission of the light passing through the material being analyzed. Thus with each material required to provide a corresponding percentage of light transmission, it can be readily obtained whether or not the material being measured satisfies the desired requirements. It is also understood that apparatus 41 could be particularly adaptive to measuring a moving strip of material, as typified in aperture mask production.

Thus there has been shown and described a new light detection apparatus which is substantially more accurate than known prior art apparatus as well as substantially less difficult to operate.

While there have been shown and described what are at present considered the preferred embodiments of the invention, it will be obvious to those skilled in the art that various changes and modifications may be made therein without departing from the scope of the invention as defined by the appended claims.

What is claimed is:

1. An apparatus for determining the amount of light passing through an apertured material having several relatively small apertures therein, said apparatus comprising:
   a light source;
   diffusion means positioned relative to said light source for diffusing the light received from said light source;
   collimation means positioned relative to said diffusion means for collimating the diffused light from said diffusion means to provide a substantially parallel beam of diffused light;
   focusing means positioned relative to said collimation means and on one side of said apertured material for receiving said substantially parallel beam of diffused light from said collimation means and providing a focused beam of light through said apertured material;
   receiving means positioned on an opposing side of said aperture material from said focusing means for receiving said focused beam of light passing through said apertured material from said focusing means; and
   measuring means operatively connected to said receiving means for measuring the amount of focused light received by said receiving means.

2. The apparatus according to claim 1 wherein said light source is a heavy filament lamp having a substantially translucent glass envelope.

3. The apparatus according to claim 1 wherein said diffusion means comprises a random mix fiber optics bundle having a first end positioned substantially adjacent said light source and a second end positioned within said collimation means.

4. The apparatus according to claim 1, wherein said collimation means comprises a collimator tube having a darkened inner surface.

5. The apparatus according to claim 1 wherein said focusing means comprises a convex lens having a convex surface for receiving said substantially parallel beam of diffused light from said collimation means.

6. The apparatus according to claim 1 wherein said receiving means comprises an electrical circuit including a temperature compensated resistor and a phototube.

7. The apparatus according to claim 6 wherein said measuring means comprises a digital voltmeter electrically connected to said electrical circuit of said receiving means for measuring the voltage generated across said temperature compensated resistor.

8. The apparatus according to claim 2 further including an electrical power supply for supplying electrical current to said lamp.

9. The apparatus according to claim 7 further including an electrical power supply for supplying electrical current to said electrical circuit of said receiving means and said digital voltmeter.

* * * * *